Aug. 12, 1958 S. D. PAYZER ET AL 2,847,179
SAFETY DEVICE FOR ACTUATING HYDRAULIC GATES
Filed Nov. 18, 1955 2 Sheets-Sheet 1

INVENTORS
S. D. Payzer
BY B. G. Sayles

Lieber & Lieber
ATTORNEYS.

Aug. 12, 1958    S. D. PAYZER ET AL    2,847,179
SAFETY DEVICE FOR ACTUATING HYDRAULIC GATES
Filed Nov. 18, 1955    2 Sheets-Sheet 2
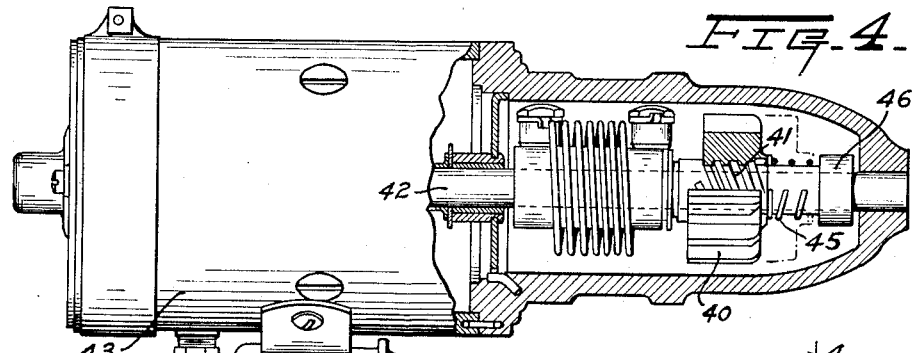
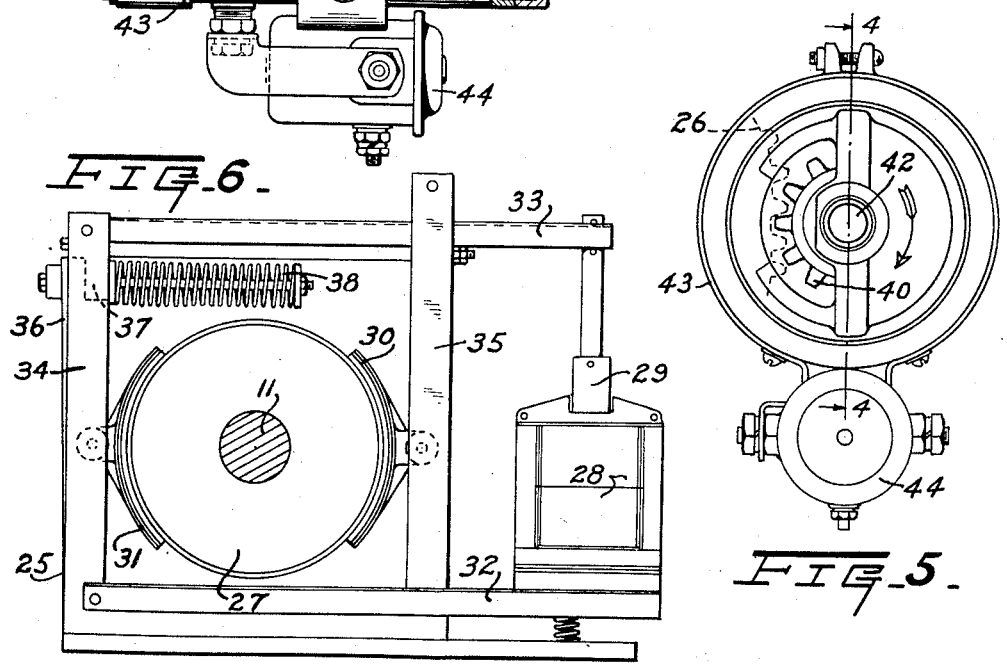
INVENTORS
S. D. Payzer
BY B. J. Sayles
Lieber & Lieber
ATTORNEYS.

United States Patent Office 2,847,179
Patented Aug. 12, 1958

2,847,179

SAFETY DEVICE FOR ACTUATING HYDRAULIC GATES

Samuel D. Payzer and Benjamin G. Sayles, Wausau, Wis., assignors to D. J. Murray Manufacturing Co., Wausau, Wis., a corporation of Wisconsin Application November 18, 1955, Serial No. 547,741

5 Claims. (Cl. 251—64)

The present invention relates generally to improvements in hydro-electric plants, and relates more specifically to improvements in the construction and operation of safety devices for effecting operation of the flow control gates of hydro-electric power installations in case abnormal conditions make it impossible to utilize the normal gate actuating means.

The primary object of the invention is to provide improved instrumentalities for insuring safe operation of a hydro-electric plant and especially the flow control gates thereof, in the event that the normal source of gate actuating power fails.

In most hydro-electric plants, the flow control gates are normally opened and closed by means of a reversible alternating current electric motor which is energized by current derived directly from the main power transmission line and cooperates through speed reduction gearing with one or more of these gates. Such gates must occasionally be quickly closed during flood or other emergency periods, and it frequently happens that when such emergencies arise, the normal actuating power source is interrupted and is therefore not available. Failure to close the control gates under such conditions may result in considerable damage to the plant equipment, so that it is extremely desirable to provide some means for effecting positive closing of these gates during emergencies.

It is therefore an important object of the present invention to provide relatively simple but highly effective auxiliary means for actuating the flow control gate or gates of a hydro-electric power installation during emergency periods.

Another important object of this invention is to provide a reliable safety device for quickly closing the control gates of an hydraulic power plant during emergencies and whenever the normal gate actuating power source fails.

Still another important object of the invention is to provide an improved system for storing electric energy during periods of normal operation of a hydroelectric power project, for use in effecting closing of the flow control gates during abnormal operating periods.

A further important object of our invention is to provide improved mechanism whereby direct current from storage batteries which have been charged during periods of normal operation of an hydraulic power installation with the aid of alternating current produced by the latter, may be utilized to quickly close the flow control gates during emergency periods.

These and other more specific objects of the invention will be apparent from the following detailed description from which it may be noted that the gist of the improvement is the provision of direct current storage batteries which are chargeable by alternating current normally being transmitted through the main line of a hydro-electric power plant, and from which electric current is available for actuating the flow control gate of the installation when the normal source of electric current for operating these gates fails.

A clear conception of the features constituting the present improvement, and of the construction and operation of a typical hydro-electric plant embodying the invention, may be had by referring to the drawings accompanying and forming a part of this specification wherein like reference characters designate the same or similar parts in the various views.

Fig. 4 is an enlarged part sectional side elevation of the auxiliary gate actuating motor and mechanism of the safety system, the section having been taken along the line 4—4 of Fig. 5;

Fig. 5 is an end view of the assemblage shown in Fig. 4;

Fig. 6 is an end view of the solenoid actuated brake involved in the improved safety device; and Fig. 7 is a side elevation of the brake assembly of Fig. 6 viewed toward the right hand side thereof.

While the invention has been illustrated and described herein as having been applied to an hydraulic power project having a single flow control gate normally adapted to be opened and closed by means of a reversible alternating current electric motor, it is not the intention to unnecessarily restrict the application of the improved safety device to such an installation; and it is also contemplated that specific descriptive terms employed herein be given the broadest possible interpretation consistent with the actual disclosure.

Figure 1:
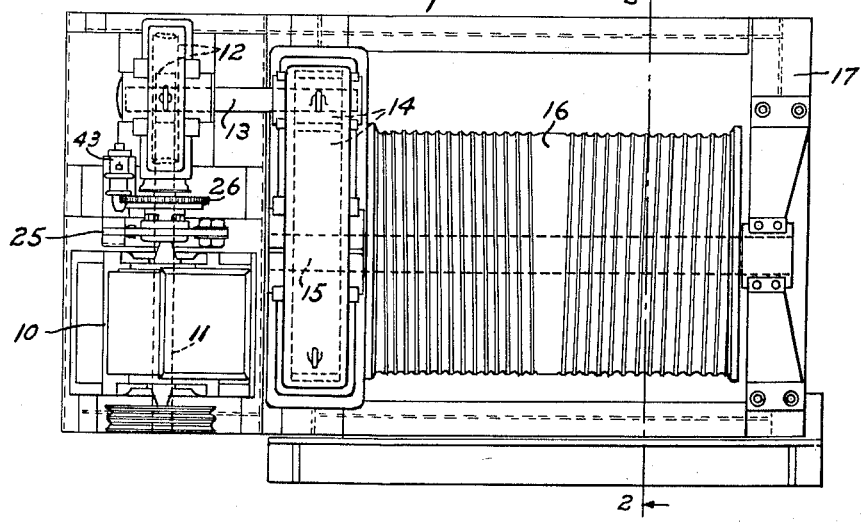
Fig. 1 is a top view of the flow control gate actuating mechanism of an hydraulic power installation having the present improved safety device associated therewith.
Figure 2:
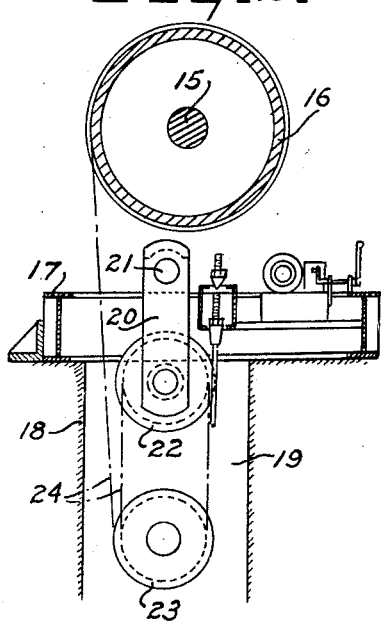
Fig. 2 is a somewhat diagrammatic and reduced transverse vertical section through the gate actuating drum of the mechanism shown in Fig. 1, the section being taken along the line 2—2.

Referring to the drawings, the typical normal gate actuating mechanism for a hydro-electric installation shown in Figs. 1 and 2, is of relatively well known construction and comprises in general, an alternating current reversible electric motor 10 having a main shaft 11 connected by speed reducing spur and worm gearing 12 with a counter shaft 13 which in turn is drivingly connected by other speed reducing spur gearing 14 with the mounting shaft 15 of a gate hoisting and lowering drum 16. The main motor 10 and the supporting bearings for the several shafts 11, 13, 15 are all carried by a rigid frame 17 carried by a foundation 18 having therein a pit 19 within which the flow control gate or gates, not shown, are normally vertically movable by means of one or more oscillatory cranks 20 secured to another counter shaft 21 also journalled in bearings carried by the frame 17. The cranks 20 have one or more sheaves 22 journalled on their swinging ends, from which other floating sheaves 23 are suspended by cables 24 which also coact with the hoisting drum 16; and this well known gate actuating arrangement is such that when the main motor 10 is operated to rotate the drum 16 in a clockwise direction as viewed in Fig. 2 the gates suspended from the lower sheaves 23 will be raised or opened, whereas rotation of the drum 16 in a counter-clockwise direction will lower or close the gates.

As illustrated in Fig. 1 the main shaft 11 of the normally functioning alternating current reversible motor 10 is provided with a special brake assembly 25 such as shown in Figs. 6 and 7, and this shaft 11 also has a large gear 26 secured thereto at the side of the brake assembly remote from the motor 10. This special brake 25 comprises a brake wheel 27 firmly secured to the motor shaft 11 and a solenoid having a coil 28 and a relatively movable core 29 adapted to actuate brake shoes 30, 31 coacting with the periphery of the wheel 27, and the coil 28 rests upon the swinging end of a pair of lower levers 32 while the core 29 is connected to the corresponding swinging end of an upper lever 33. The levers 32, 33 are all swingably attached to upright bars 34, and the brake shoe 30 is pivotally attached to another pair of upright bars 35, while the other brake shoe 31 is likewise attached to a pair of swingable arms 36 the upper ends of which are engageable by a lug 37 secured to the levers 33 and which reacts against a pair of compression springs 38. This special brake assemblage 35 is such that when the coil 28 of the solenoid is energized the core 29 will be lowered to swing the levers 32, 33 toward each other in a pincer movement, thereby causing the lug 37 secured to the lever 33 to swing the arms 36 to the left as viewed in Fig. 6, against the action of the springs 38 and simultaneously forcing the brake shoes 31, 30 out of braking engagement with the wheel 27 so as to release the motor shaft 11 for free rotation.

The gear 26 which is secured to the shaft 11 between the brake assembly 25 and the speed reducing gearing 12, is adapted to mesh with a laterally movable pinion 40 coacting with a quick pitch screw thread 41 formed on the shaft 42 of an auxiliary direct current driven gate starting motor 43 such as shown in detail in Figs. 4 and 5. This starting motor 43 is mounted upon the main frame 17 near the transmission gearing associated with the main motor 10 as illustrated in Fig. 1, and the direct current motor is provided with a starting relay 44 located therebeneath as indicated in Figs. 4 and 5. The laterally shiftable pinion 40 is engaged on one side by a helical compression spring 45 surrounding the shaft 42 and which reacts against a collar 46; and this auxiliary gate lowering assemblage is such that when the brake 25 has been released and the motor 43 is started by the direct current admitted through the relay 44, the pinion 40 will be moved to the right against the action of the spring 45 into the dot-and-dash position depicted in Fig. 4 and will thereby drivingly engage the gear 26 on the main motor shaft 11. However, whenever the auxiliary motor 43 stops, the spring 45 quickly forces the pinion 40 to the left out of engagement with the gear 26 so as to leave the shaft 11 free for rotation by the main motor 10.

Figure 3:
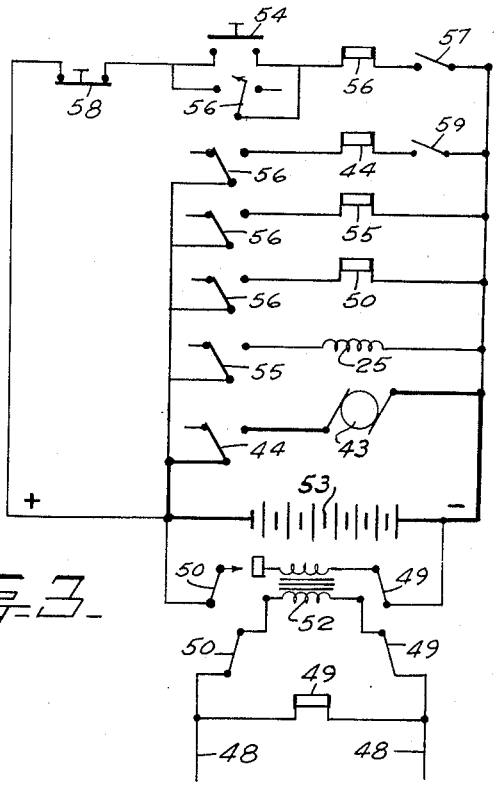
Fig. 3 is a wiring diagram of the electrical system involved in the improved flow control gate actuating mechanism.

Referring to the wiring diagram of Fig. 3 showing the electrical system for actuating the emergency gate closing motor 43, alternating current is normally supplied to this system from a main line 48 past a line relay 49 and a trickle charge relay 50 and a trickle charger 52. Current from the trickle charger 52 flows through another line relay 49 and trickle charge relay 50 to storage battery 53 and this battery 53 is adapted to be connected by actuation of a starting switch 54 with the starting relay 44 of the gate starting motor 43. The solenoid coil 28 which releases the brake 25 is adapted to be energized through a relay 55, and the auxiliary gate closing system is also provided with a control relay 56 and with a limit switch 57 and a stop switch 58. A zero speed switch 59 is also provided as shown, thus completing the auxiliary safety gate control system.

During normal operation of the hydro-electric plant, the main alternating current motor 10 will be available to drive the drum 16 so as to open or close the gate or gates suspended from the lower sheaves 23, but whenever an emergency such as flood conditions arises, the gates must be closed promptly. If alternating current from the main line 48 continues to be available when such emergency arises, the main motor 10 can be operated to quickly close the gates, but in cases where the supply of such alternating current is interrupted then the operation of the auxiliary motor 43 must be relied upon to start the heavy gates in their descent by gravity toward closing position. It is to be noted that when the plant is functioning normally, the direct current storage battery 53 will be maintained charged to capacity by the trickle charger 52, so that a supply of direct current will always be available for emergencies.

When the auxiliary safety system is required, closing of the starter switch 54 will energize the relay 56 through the limit switch 57 and this will close the holding circuit across the stop switch 58. The control relay 56 will simultaneously close the starter relay 44 through the zero speed switch 59 which may be mounted upon the main alternating current motor 10 or upon other conveniently accessible equipment. The brake relay 55 will then close and will energize the coil 28 of the motor brake 25 thus releasing the shaft 11 for free rotation of the armature of the main motor 10, and the trickle charge relay 50 will function to disconnect the trickle charger 52 from the storage battery 53 and from the alternating current supply line 48. The starting motor relay 44 will also function to start the auxiliary motor 43 and to cause the pinion 40 to engage the ring gear 26 mounted upon the main motor shaft 11 thus promptly overcoming the inertia of the gearing and other hoisting mechanism and of the gates and causing the latter to descend by gravity. The starting motor relay 44 is connected in with the zero speed switch 59, so that when the gate actuating motor 10 reaches a predetermined speed the switch 59 will disconnect the starting motor 43. The zero speed switch 59 will close only in case the lowering speed of the descending gates drops below the pre-set speed, in order to again start the safety motor 43; and when the gates reach their closed position the limit switch 57 will open thereby resetting all relays to normal position. The stop switch 58 may however be opened at any time during the downward closing movement of the gates so as to stop these gates, and as previously indicated the trickle charge relay 50 is connected to the alternating current power line 48 through the line relay 49 in a manner whereby the trickle charger 52 will be disconnected from the alternating current supply line 48 in case of failure of the latter thereby preserving the storage battery charge.

From the foregoing detailed description of the construction and operation of the mechanism and control system involved, it should be apparent that the present invention in fact provides simple but highly effective means for closing the gates of a hydro-electric plant in emergencies as when the normal gate actuating devices become incapacitated. The improved safety rig while being available for use at all times, in no way interferes with the normal opening and closing of the gates, and also provides for only partial closing during emergencies if so desired. The auxiliary motor 42 need be of limited capacity only sufficient to start the heavy gates in their downward closing movement after which final closing is effected by gravity, and the improved electrical control system is sufficiently flexible so as to make it active or inactive at a moment's notice.

It should be noted, however, that while the principal use of the direct current gate actuating means is for emergencies as when no alternating current is available, the auxiliary direct current motor 43 may also be utilized to lower the gates at any time even when alternating current is still available for actuating the main motor 10; and the invention is also applicable to installations embodying gates of various types operable with diverse opening and closing rigs.

The cost of the equipment required in the improved safety device is minor compared with the damage which might result if the gates cannot be closed quickly during emergencies, and the improved system is conveniently controllable by a single attendant.

It should be understood that it is not desired to limit this invention to the exact details of construction of the mechanism or to the precise mode of operation of the safety gate control system, herein specifically shown and described, since various modifications within the

We claim:

1. In a hydro-electric power plant, a gravity closing gate normally operable by a main alternating current electric motor, a brake for normally holding the gravity biased gate in raised position, direct current storage means chargeable by alternating electric current normally being supplied to actuate said main motor, an auxiliary normally inactive electric motor operable by direct current derived from said storage means and being available for use to cause said gate to close when the supply of alternating current for actuating said main motor fails, and means for releasing said brake to allow said auxiliary motor to become active to cause said gate to close.

2. In a hydro-electric power plant, a gravity closing gate normally operable through gearing by a main alternating current electric motor, a brake for normally holding the gravity biased gate in raised position, direct current storage batteries chargeable by alternating electric current normally being supplied to actuate said main motor, an auxiliary normally inactive electric motor operable by direct current derived from said batteries and being available for use when the alternating current supply fails, and means for releasing said brake and for drivingly connecting said auxiliary motor with said gate operating gearing to cause said gate to close by gravity when the supply of alternating current for actuating said main motor fails.

3. In a hydro-electric power plant having a flow control gate normally operable through gearing by an alternating current electric motor driven by current derived from a normally available source, a brake normally holding said gate in open position, direct current storage means chargeable by current from the alternating current source during periods of normal availability, a direct current motor operable by current derived from said storage means and being available for use only when the alternating current supply fails, and means for releasing said brake and for drivingly connecting said direct current motor with the gate operating gearing to cause the gate to gravitate toward closed position when the supply of alternating current from the source fails.

4. In a hydro-electric power plant having a flow control gate normally operable through gearing by an alternating current electric motor driven by current derived from a normally available source, a brake for said alternating current motor, direct current storage batteries chargeable by current from the alternating current source during periods of normal availability, a direct current motor operable by current derived from said storage batteries, and means for releasing said brake and for drivingly connecting said direct current motor with the gate operating gearing to cause the gate to gravitate toward closed position only when the supply of alternating current from the source fails.

5. In a hydro-electric power plant having a flow control gate normally operable through gearing by an alternating current electric motor driven by current derived from a normally available source, a brake for said alternating current motor, direct current storage batteries chargeable by current from the alternating current source during periods of normal availability, a direct current motor operable by current derived from said storage batteries, and direct current actuated devices for simultaneously releasing said brake and for drivingly connecting said direct current motor with the gate operating gearing to positively cause the gate to gravitate toward closed position only when the supply of alternating current from the source is not available.

References Cited in the file of this patent

UNITED STATES PATENTS

| | | |
|---|---|---|
| 1,330,567 | Woolson | Feb. 10, 1920 |
| 1,341,660 | Millward | June 1, 1920 |
| 1,741,320 | Lee | Dec. 31, 1929 |
| 1,749,310 | Belcher | Mar. 4, 1930 |